UNITED STATES PATENT OFFICE.

OSCAR BALLY, OF MANNHEIM, AND HUGO WOLFF, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

ANTHRACENE COMPOUND AND PROCESS OF MAKING SAME.

No. 809,894.    Specification of Letters Patent.    Patented Jan. 9, 1906.

Application filed October 11, 1905. Serial No. 282,320.

*To all whom it may concern:*

Be it known that we, OSCAR BALLY, doctor of philosophy and chemist, a citizen of the Swiss Republic, residing at Mannheim, in the Grand Duchy of Baden, and HUGO WOLFF, doctor of philosophy and chemist, a subject of the Grand Duke of Baden, residing at Ludwigshafen-on-the-Rhine, in the Kingdom of Bavaria, German Empire, have invented new and useful Improvements in Anthracene Compounds and Processes of Making the Same, of which the following is a specification.

In the specifications of Letters Patent Nos. 786,085, 787,859, 793,558, and 798,104 is described the production of compounds of the anthracene series by condensing with glycerin or equivalent body an anthracene body—such, for instance, as anthraquinon, anthranol, alizarin, beta-amidoanthraquinon, naphthanthraquinon, and also the homologues and sulfo-acids of these compounds. In each case a compound containing a benzanthrone group is obtained. We have further discovered that halogen substituted products of the aforesaid anthracene bodies can also be condensed with glycerin or its anhydrids or the esters or the ethers of these compounds, the condensation proceeding in a manner similar to that followed when non-substituted anthracene compounds are employed.

The new compounds obtained according to our invention and which we desire to be understood as claiming generically can be designated by the name "halogen-benzanthrones," and they contain a benzanthrone grouping and also halogen. When dry, they consist of from dark-green to yellow powders which are soluble in concentrated sulfuric acid, yielding yellow-brown to reddish-yellow fluorescent solutions. On being melted with caustic alkali they yield coloring-matters which from an alkaline hydrosulfite vat dye vegetable fiber substantively.

The following examples will serve to further illustrate the nature of our invention, which, however, is not confined to these examples. The parts are by weight.

Example 1: Dissolve one (1) part of beta-chlor-anthraquinon in twenty-five (25) parts of sulfuric acid, containing about eighty (80) per cent. of $H_2SO_4$, add two (2) parts of glycerin and two (2) parts of anilin sulfate, and then heat the whole slowly to a temperature of about one hundred and forty (140) degrees centigrade. Maintain the melt at this temperature for some time, and after allowing the melt to cool pour it into water and filter off the condensation product, which separates out. The beta-chlor-benzanthrone so obtained is, when dry, a dark-green powder which dissolves in concentrated sulfuric acid, the solution being red-brown with a yellowish-brown fluorescence. Upon treating this product with caustic alkali—for instance, with alcoholic potash—a violet-blue coloring-matter is obtained.

Example 2: Heat one (1) part of dibrom-anthraquinon (obtained from tetrabrom-anthracene by oxidation with chromic acid) with glycerin, sulfuric acid, and a reducing agent in the manner described in the foregoing example at a temperature of from one hundred and forty (140) to one hundred and forty-five (145) degrees centigrade until on testing a portion it is found that no unaltered dibrom-anthraquinon remains in the melt. Allow the melt to cool and pour it into water and work up. The raw condensation product thus obtained is a greenish-black powder; but it can be purified by extraction with benzene and be thus obtained as a yellow crystalline powder, which dissolves in concentrated sulfuric acid, the solution being an intense reddish yellow with a slight fluorescence. Upon treating this product with caustic alkali—for instance, with alcoholic potash—a violet-blue coloring-matter is obtained.

Example 3: Dissolve one (1) part of chlor-anthraquinon sulfo-acid (prepared by the chlorination of anthraquinon monosulfo-acid in sulfuric-acid solution) in twenty-four (24) parts of eighty-two (82) per cent. sulfuric acid. Add two (2) parts of glycerin and two (2) parts of anilin sulfate and heat slowly to a temperature of one hundred and fifty (150) degrees centigrade and maintain this temperature until a homogeneous reddish-brown solution is obtained. Allow to cool, pour onto ice, and filter off and wash and dry the precipitate. The condensation product so obtained consists of a brown-yellow powder which is difficultly soluble in cold water, more easily soluble in hot water and in dilute caustic-soda solution. It is soluble in concentrated sulfuric acid, yielding a yellow-brown solution with a reddish-green fluorescence.

Example 4: Heat ten (10) parts of beta-chlor-anthraquinon with two hundred and fifty (250) parts of eighty-two (82) per cent. sulfuric acid, twenty (20) parts of acetin, and twenty (20) parts of anilin sulfate at a temperature of from one hundred and forty-five (145) to one hundred and fifty (150) degrees centigrade until a test portion shows that no unaltered beta-chlor-anthraquinon is present. Allow the melt to cool, pour onto ice, and filter off, wash, and dry the condensation product, which is identical with that obtained in the foregoing Example 1.

In a similar manner other halogen-anthracene compounds can be condensed with glycerin or an equivalent thereof.

What we claim is—

1. The process for the production of anthracene compounds by condensing a hereinbefore-defined halogen anthracene body with glycerin.

2. The process for the production of anthracene compounds by condensing a hereinbefore-defined halogen anthracene body with glycerin in the presence of sulfuric acid.

3. The process for the production of anthracene compounds by condensing beta-chlor-anthraquinon with glycerin in the presence of sulfuric acid.

4. As new articles of manufacture the anthracene compounds obtainable by condensing a hereinbefore-defined halogen anthracene body with glycerin, which compounds contain a benzanthrone grouping and also contain halogen, and which, when dry, consists of from green to yellow powders, which are soluble in concentrated sulfuric acid yielding reddish-brown to reddish-yellow fluorescent solutions, and which on melting with caustic alkali yield coloring-matters which from an alkaline hydrosulfite vat dye vegetable fiber substantively.

5. As a new article of manufacture the anthracene compound obtainable by condensing beta-chlor-anthraquinon with glycerin, which compound contains a benzanthrone grouping and also contains chlorin and which, when dry, consists of a green powder which is soluble in concentrated sulfuric acid yielding a reddish-brown solution with a yellowish-brown fluorescence and which on melting with caustic alkali yields a blue-violet coloring-matter which from an alkaline hydrosulfite vat dyes vegetable fiber substantively.

In testimony whereof we have hereunto set our hands in the presence of two subscribing witnesses.

OSCAR BALLY.
HUGO WOLFF.

Witnesses:
ERNEST F. EHRHARDT,
T. ALEC. LLOYD.